US006964210B2

(12) United States Patent
Colbourne

(10) Patent No.: US 6,964,210 B2
(45) Date of Patent: Nov. 15, 2005

(54) GEAR TOOTH PROFILE

(75) Inventor: John R. Colbourne, St. Albert (CA)

(73) Assignee: Genesis Partners, L.P., Horsham, PA (US)

( * ) Notice: Subject to any disclaimer, the term of this patent is extended or adjusted under 35 U.S.C. 154(b) by 152 days.

(21) Appl. No.: 10/420,141

(22) Filed: Apr. 22, 2003

(65) Prior Publication Data

US 2003/0198526 A1 Oct. 23, 2003

Related U.S. Application Data

(60) Provisional application No. 60/374,655, filed on Apr. 22, 2002.

(51) Int. Cl.[7] ............................ F16H 55/08; B23F 1/00
(52) U.S. Cl. ................ 74/462; 407/20; 409/1
(58) Field of Search .............. 74/462, 457; 407/20–29; 409/1

(56) References Cited

U.S. PATENT DOCUMENTS

| 466,923 | A | 1/1892 | Price |
|---|---|---|---|
| 1,313,035 | A | 8/1919 | Williams |
| 1,425,144 | A | 8/1922 | Schmick |
| 1,601,750 | A | 10/1926 | Wildhaber |
| 1,613,702 | A | 1/1927 | Hammar |
| 1,772,986 | A | 8/1930 | Dunham |
| 1,973,185 | A | 9/1934 | Trbojevich |
| 2,031,888 | A | 2/1936 | Hill |
| 2,071,317 | A | 2/1937 | Barkley |
| 2,091,317 | A | 8/1937 | Hill |
| 2,207,290 | A | 7/1940 | Hale |
| 2,230,418 | A | 2/1941 | Wildhaber |
| 2,308,558 | A | 1/1943 | Wildhaber |
| 2,436,231 | A | 2/1948 | Schellens |
| 2,686,155 | A | 8/1954 | Willis et al. |
| 2,951,053 | A | 8/1960 | Reuter et al. |
| 2,955,481 | A | 10/1960 | Jackel |
| 2,990,724 | A | 7/1961 | Anderson et al. |
| 3,180,172 | A | 4/1965 | Leggatt |
| 3,232,134 | A | 2/1966 | Kluwe et al. |
| 3,251,236 | A | 5/1966 | Wildhaber |
| 3,371,552 | A | 3/1968 | Soper |

(Continued)

FOREIGN PATENT DOCUMENTS

FR 2 074 302 10/1971

OTHER PUBLICATIONS

ANSI/AGMA 1012-F90, "Gear Nomenclature, Definitions of Terms with Symbols", Apr. 1990, pp. i through 56.*

(Continued)

*Primary Examiner*—Erica Cadugan
(74) *Attorney, Agent, or Firm*—Akin Gump Strauss Hauer & Feld, LLP

(57) ABSTRACT

A gear and method for producing the gear. The gear has a gear tooth profile conjugate to a gear basic-cutter tooth-profile having an addendum with a convex portion having an addendum point proximal to a pitch line and a dedendum with a concave portion having a dedendum point proximal to the pitch line. The convex portion is complementary with a corresponding portion of a mating-gear basic-cutter tooth-profile dedendum. The concave portion is complementary with a corresponding portion of the mating-gear basic-cutter tooth-profile addendum. A transition zone between the addendum point and the dedendum point has a predetermined width. The gear basic-cutter tooth-profile has a predetermined half pitch relief at the pitch line and continuity of profile and continuity of slope at the addendum point.

8 Claims, 3 Drawing Sheets

U.S. PATENT DOCUMENTS

| | | |
|---|---|---|
| 3,533,300 A | 10/1970 | Studer |
| 3,631,736 A | 1/1972 | Saari |
| 3,693,225 A * | 9/1972 | Wildhaber .................. 409/39 |
| 3,709,055 A | 1/1973 | Grove |
| 3,855,874 A | 12/1974 | Honma et al. |
| 3,937,098 A | 2/1976 | Rouverol |
| 3,982,445 A | 9/1976 | Rouverol |
| 4,031,770 A | 6/1977 | Ishikawa |
| 4,051,745 A | 10/1977 | Ishikawa |
| 4,108,047 A * | 8/1978 | Frankiw ...................... 409/32 |
| 4,121,481 A | 10/1978 | Riegler et al. |
| 4,640,149 A | 2/1987 | Drago |
| 4,651,588 A | 3/1987 | Rouverol |
| 5,098,231 A * | 3/1992 | Haug .......................... 407/28 |
| 5,271,289 A | 12/1993 | Baxter, Jr. |
| 5,546,824 A | 8/1996 | Miller et al. |
| 5,605,518 A | 2/1997 | Kogure et al. |
| 6,101,892 A | 8/2000 | Berlinger, Jr. et al. |
| 6,178,840 B1 | 1/2001 | Colbourne et al. |
| 2002/0134184 A1 | 9/2002 | Hawkins |

OTHER PUBLICATIONS

Nicholas Chironis "Design of Novikov Gears," *Product Engineering*, pp. 682-603 (Sep. 17, 1962).

J.R. Colbourne "The Contact Stress in Novikov Gears," *Mech. Mach. Theory*, 24(3):223-229 (1989).

Darle W. Dudley, Gear Handbook—"The Design, Manufacture and Application of Gears," pp. 1-5 to 1-7 (1962).

"Gear Nomenclature (Geometry) Terms, Definitions, Symbols and Abbreviations", AGMA Standard, pp. 1-20 (Jun. 1976); and.

Earle Buckingham "Analytical Mechanics of Gears," p. 18-23, McGraw-Hill, New York, 1949, republished by Dover Publications, Inc., New York, 1963.

* cited by examiner

GEAR TOOTH PROFILE

CROSS-REFERENCE TO RELATED APPLICATIONS

This application is related to U.S. Provisional Patent Application No. 60/374,655, filed Apr. 22, 2002, and claims the earlier filing date of the provisional application which is incorporated herein by reference.

BACKGROUND OF THE INVENTION

The present invention relates to a family of gears having tooth profiles that are conjugate through most of the dedendum and addendum and a transition zone between the dedendum and addendum having no contact at the pitch circles. Additionally, the present invention also relates to a method for manufacturing gears having tooth profiles that are conjugate through most of the dedendum and addendum and that are not conjugate in the transition zone.

In the early Wildhaber-Novikov gears, as described by Chironis in "Design of Novikov Gears", (a chapter of "Gear Design and Application", McGraw-Hill, 1967, pp 124–135), the pinion is all-addendum and the gear tooth is all-dedendum. The transverse section tooth profile of the pinion is a convex circular arc, while that of the gear is a concave circular arc of slightly larger radius. These profiles are not conjugate. Contact takes place in each transverse section at one point only, usually near the middle of the profile. Consequently, there is no contact at the pitch point.

Later versions of Wildhaber-Novikov gears, also called "circular arc" gears, have profiles which lie both inside and outside the pitch circles. These profiles are known as double-mesh type. In each gear, the addendum is convex, either circular or approximately circular, and the dedendum profile is concave, either circular or approximately circular. The transverse section profiles of circular arc gears are not exactly circular as they are made conjugate to a basic cutter whose tooth profiles are circular arcs in either the transverse or the normal sections. The pinion and gear in such a gear pair are not conjugate with each other. Contact occurs in each transverse section at only one point in the addendum and one point in the dedendum. Typical examples of these types of gears are disclosed in U.S. Pat. No. 3,533,300 (Studer) and U.S. Pat. No. 3,855,874 (Honma). The circular arc gears disclosed in Studer are referred to therein as "nonconjugate", while the circular arc gears disclosed in Honma are referred to therein as "of the so-called point contact type".

In one respect, Studer or Honma type gears are similar to Convoloid gears disclosed in U.S. Pat. No. 6,101,892 (the '892 patent), incorporated herein in its entirety by reference, as each has no contact at the pitch circles. However, in other respects, Convoloid gears differ from Studer or Honma type gears. For example, Convoloid gears are conjugate through most of the addendum and most of the dedendum, with only a small non-conjugate section at the pitch circles, where no contact takes place; whereas, Wildhaber-Novikov and circular arc gears are not conjugate at any part of their profiles, and contact only occurs at one or two points of each transverse section.

The '892 patent describes full-depth Convoloid gears and additionally discloses a method for designing conjugate gear tooth profiles with specified relative curvatures. Further, the '892 patent discloses the existence of a section of each profile at the pitch circles, known as the transition zone, where no contact takes place. The transition zone is essential, because the relative curvature of profiles which are conjugate at the pitch point is given by the Euler-Savary equation, and cannot be specified by the profile designer.

Conjugate tooth profiles can be designed in the following manner. The dedendum of each tooth could be specified as any concave curve, and the addendum of the meshing gear designed as the corresponding conjugate profile. For example, the dedendum could be of the form $y=Ax^b$, where the y axis lies along a tooth space center-line, and the origin is at the root. Another example is the well-known cycloidal gear, where the dedendum is a hypocycloid, and the addendum is an epicycloid. In all such cases, it is possible to choose the dedendum profile as a concave curve, in such a manner that the conjugate addendum is convex. The relative curvature will then be mostly less than that of involute gears, even though it has not been specified directly by the profile designer.

One problem with the aforementioned design is that the relative curvature increases very rapidly near the pitch point, and the value at the pitch point is extremely high, due to the low pressure angle at that point. In the case of the cycloidal gears, the relative curvature is theoretically infinite. Thus, for these profiles to offer any benefit, they would need a transition zone at the pitch circles, similar to the profiles in the '892 patent.

The '892 patent describes the transition zone as a non-conjugate part of the profile, which does not come into contact with the meshing gear. The '892 patent is directed to any tooth profile which is conjugate through most of the dedendum and addendum, but has a small zone of no contact at the pitch circles. However, it is difficult to design tooth profiles that are taught by the '892 patent and that can be cut by conventional gear-cutting machines. Although a hob or a shaper cutter with a small protuberance at the pitch circle could possibly cut a gear which is non-conjugate at its pitch circle, the hob or shaper cutter would also undercut much of the conjugate gear tooth profile, leaving a profile which is useless. Accordingly there is a need for gears having a tooth profile with a transition zone that is non-conjugate at the pitch circle and that can be readily produced with conventional hobs or shaper cutters.

BRIEF SUMMARY OF THE INVENTION

Briefly stated, one embodiment of the present invention is directed to a gear for mating with a mating gear having a plurality of mating-gear teeth each having a mating-gear tooth profile conjugate to a mating-gear basic-cutter tooth profile including a mating-gear basic-cutter tooth-profile addendum, a mating-gear basic-cutter tooth-profile dedendum, and a mating-gear basic-cutter tooth-profile transition zone between the mating-gear basic-cutter tooth-profile addendum and the mating-gear basic-cutter tooth-profile dedendum. The gear comprises a plurality of gear teeth each having a gear tooth profile comprising a gear tooth-profile addendum, a gear tooth-profile dedendum, and a gear tooth-profile transition zone between the gear tooth-profile addendum and the gear tooth-profile dedendum. The gear tooth profile is conjugate to a gear basic-cutter tooth-profile intersecting a gear basic-cutter pitch line at a gear basic-cutter pitch point. The gear basic-cutter tooth profile comprises a gear basic-cutter tooth-profile addendum, a gear basic-cutter tooth-profile dedendum, and a gear basic-cutter tooth-profile transition zone. The gear basic-cutter tooth-profile addendum has a tip point distal to the gear basic-cutter pitch line. The gear basic-cutter tooth-profile addendum is conjugate to the gear tooth-profile dedendum and is complementary with a corresponding portion of the mating-gear basic-cutter tooth-profile dedendum. A gear basic-cutter tooth-profile convex portion is within the gear basic-cutter tooth-profile addendum. The gear basic-cutter tooth-profile convex portion has a gear basic-cutter tooth-profile addendum point proximal to the gear basic-cutter pitch line. The gear basic-cutter tooth-profile dedendum has a limit point distal to the gear basic-cutter pitch line. The gear basic-cutter tooth-profile dedendum is conjugate to the gear tooth-profile addendum and is complementary with a corresponding portion of the mating-gear basic-cutter tooth-profile addendum. A gear basic-cutter tooth-profile concave portion is within the gear basic-cutter tooth-profile dedendum. The gear basic-cutter tooth-profile concave portion has a gear basic-cutter tooth-profile dedendum point proximal to the gear basic-cutter pitch line. The gear basic-cutter tooth-profile transition zone is between the gear basic-cutter tooth-profile addendum point and the gear basic-cutter tooth-profile dedendum point. The gear basic-cutter tooth-profile transition zone has a predetermined gear basic-cutter tooth-profile transition-zone width. The gear basic-cutter tooth profile has a predetermined gear basic-cutter tooth-profile half pitch relief at the gear basic-cutter pitch line and continuity of profile and continuity of slope at the gear basic-cutter tooth-profile addendum point. The gear basic-cutter tooth-profile addendum has an addendum portion having an addendum-portion shape and an addendum-portion thickness. The addendum portion extends from the tip point to the addendum point. The addendum-portion shape is at least substantially identical to a corresponding portion of a reference addendum of a reference gear basic-cutter tooth profile further comprising a linear reference transition zone between the reference addendum and a reference dedendum having a reference-dedendum thickness. The reference addendum has a reference-addendum thickness. The addendum-portion thickness is less than the reference-addendum thickness by about twice the predetermined half pitch relief. The gear basic-cutter tooth-profile dedendum has a dedendum portion having a dedendum-portion shape and a dedendum-portion thickness. The dedendum portion extends from the limit point to the pitch line. The dedendum-portion shape is at least substantially identical to a corresponding portion of the reference dedendum. The dedendum thickness is more than the reference-dedendum thickness by about twice the predetermined half pitch relief.

The present invention is alternatively directed to a gear basic cutter for making a gear mateable with a mating gear having a plurality of mating-gear teeth each having a mating-gear tooth profile conjugate to a mating-gear basic-cutter tooth profile including a mating-gear basic-cutter tooth-profile addendum, a mating-gear basic-cutter tooth-profile dedendum, and a mating-gear basic-cutter tooth-profile transition zone between the mating-gear basic-cutter tooth-profile addendum and the mating-gear basic-cutter tooth-profile dedendum. The gear basic cutter comprises a plurality of gear basic-cutter teeth each having a gear basic-cutter tooth profile intersecting a gear basic-cutter pitch line at a gear basic-cutter pitch point. The gear basic-cutter tooth profile comprises a gear basic-cutter tooth-profile addendum, a gear basic-cutter tooth-profile dedendum, and a gear basic-cutter tooth-profile transition zone. The gear basic-cutter tooth-profile addendum has a tip point distal to the gear basic-cutter pitch line. The gear basic-cutter tooth-profile addendum is conjugate to the gear tooth-profile dedendum and is complementary with a corresponding portion of the mating-gear basic-cutter tooth-profile dedendum. A gear basic-cutter tooth-profile convex portion is within the gear basic-cutter tooth-profile addendum. The gear basic-cutter tooth-profile convex portion has a gear basic-cutter tooth-profile addendum point proximal to the gear basic-cutter pitch line. The gear basic-cutter tooth-profile dedendum has a limit point distal to the gear basic-cutter pitch line. The gear basic-cutter tooth-profile dedendum is conjugate to the gear tooth-profile addendum and is complementary with a corresponding portion of the mating-gear basic-cutter tooth-profile addendum. A gear basic-cutter tooth-profile concave portion is within the gear basic-cutter tooth-profile dedendum. The gear basic-cutter tooth-profile concave portion has a gear basic-cutter tooth-profile dedendum point proximal to the gear basic-cutter pitch line. The gear basic-cutter tooth-profile transition zone is between the gear basic-cutter tooth-profile addendum point and the gear basic-cutter tooth-profile dedendum point. The gear basic-cutter tooth-profile transition zone has a predetermined gear basic-cutter tooth-profile transition-zone width. The gear basic-cutter tooth-profile has a predetermined gear basic-cutter tooth-profile half pitch relief at the gear basic-cutter pitch line and continuity of profile and continuity of slope at the gear basic-cutter tooth-profile addendum point.

The present invention is alternatively directed to a gear pair comprising a first gear and a second gear. The first gear comprises a plurality of first gear teeth each having a first gear tooth profile comprising a first gear tooth-profile addendum, a first gear tooth-profile dedendum, and a first gear tooth-profile transition zone between the first gear tooth-profile addendum and the first gear tooth-profile dedendum. The first gear tooth profile is conjugate to a first gear basic-cutter tooth-profile intersecting a first gear basic-cutter pitch line at a first gear basic-cutter pitch point. The first gear basic-cutter tooth profile comprises a first gear basic-cutter tooth-profile addendum, a first gear basic-cutter tooth-profile dedendum, and a first gear basic-cutter tooth-profile transition zone. The first gear basic-cutter tooth-profile addendum has a first tip point distal to the first gear basic-cutter pitch line. The first gear basic-cutter tooth-profile addendum is conjugate to the first gear tooth-profile dedendum. A first gear basic-cutter tooth-profile convex portion is within the first gear basic-cutter tooth-profile addendum. The first gear basic-cutter tooth-profile convex portion has a first gear basic-cutter tooth-profile addendum point proximal to the first gear basic-cutter pitch line. The first gear basic-cutter tooth-profile dedendum has a first limit point distal to the first gear basic-cutter pitch line. The first gear basic-cutter tooth-profile dedendum is conjugate to the first gear tooth-profile addendum. A first gear basic-cutter tooth-profile concave portion is within the first gear basic-cutter tooth-profile dedendum. The first gear basic-cutter tooth-profile concave portion has a first gear basic-cutter tooth-profile dedendum point proximal to the first gear basic-cutter pitch line. The first gear basic-cutter tooth-profile transition zone is between the first gear basic-cutter tooth-profile addendum point and the first gear basic-cutter tooth-profile dedendum point. The first gear basic-cutter tooth-profile transition zone has a predetermined first gear basic-cutter tooth-profile transition-zone width. The first gear basic-cutter tooth-profile has a predetermined first gear basic-cutter tooth-profile half pitch relief at the first gear basic-cutter pitch line and continuity of profile and continuity of slope at the first gear basic-cutter tooth-profile addendum point.The first gear basic-cutter tooth-profile addendum has a first addendum portion having a first addendum-portion shape and a first addendum-portion thickness. The first addendum portion extends from the first tip point to the first gear basic-cutter tooth-profile addendum point. The first addendum-portion shape is at least substantially identical to a corresponding portion of a first reference addendum of a first reference aear basic-cutter tooth profile further comprising a first linear reference transition zone between the first reference addendum and a first reference dedendum having a first reference-dedendum thickness. The first reference addendum has a first reference-addendum thickness. The first addendum-portion thickness is less than the first reference-addendum thickness by about twice the predetermined half pitch relief The first gear basic-cutter tooth-profile dedendum has a first dedendum portion having a first dedendum-portion shape and a first dedendum-portion thickness. The first dedendum portion extends from the first limit point to the first pitch line. The first dedendum-portion shape is at least substantially identical to a correspondina portion of the first reference dedendum. The first dedendum thickness is more than the first reference-dedendum thickness by about twice the predetermined half pitch relief The second gear comprises a second plurality of second gear teeth each having a second gear tooth profile comprising a second gear tooth-profile addendum, a second gear tooth-profile dedendum, and a second gear tooth-profile transition zone between the second gear tooth-profile addendum and the second gear tooth-profile dedendum. The second gear tooth profile is conjugate to a second gear basic-cutter tooth-profile intersecting a second gear basic-cutter pitch line at a second gear basic-cutter pitch point. The second gear basic-cutter tooth profile comprises a second gear basic-cutter tooth-profile addendum, a second gear basic-cutter tooth-profile dedendum, and a second gear basic-cutter tooth-profile transition zone. The second gear basic-cutter tooth-profile addendum has a second tip point distal to the second gear basic-cutter pitch line. The second gear basic-cutter tooth-profile addendum is conjugate to the second gear tooth-profile dedendum. A second gear basic-cutter tooth-profile convex portion is within the second gear basic-cutter tooth-profile addendum and is complementary with a corresponding portion of the first gear basic-cutter tooth-profile dedendum. The second gear basic-cutter tooth-profile convex portion has a gear basic-cutter tooth-profile addendum point proximal to the gear basic-cutter pitch line. The second gear basic-cutter tooth-profile dedendum has a second limit point distal to the second gear basic-cutter pitch line. The second gear basic-cutter tooth-profile dedendum is conjugate to the second gear tooth-profile addendum. A second gear basic-cutter tooth-profile concave portion is within the second gear basic-cutter tooth-profile dedendum and is complementary with a corresponding portion of the first gear basic-cutter tooth-proffle addendum. The second gear basic-cutter tooth-profile concave portion has a second gear basic-cutter tooth-profile dedendum point proximal to the second gear basic-cutter pitch line. The second gear basic-cutter tooth-profile transition zone is between the second gear basic-cutter tooth-profile addendum point and the second gear basic-cutter tooth-profile dedendum point. The second gear basic-cutter tooth-profile transition zone has a predetermined second gear basic-cutter tooth-profile transition-zone width. The second gear basic-cutter tooth-profile has a predetermined second gear basic-cutter tooth-profile half pitch relief at the second gear basic-cutter pitch line and continuity of profile and continuity of slope at the second gear basic-cutter tooth-profile addendum point. The second gear basic-cutter tooth-profile addendum has a second addendum portion having a second addendum-portion shape and a second addendum-portion thickness. The second addendum portion extends from the second tip point to the second gear basic-cutter tooth-profile addendum point. The second addendum-portion shape is at least substantially identical to a corresponding portion of a second reference addendum of a second reference gear basic-cutter tooth profile further comprising a second linear reference transition zone between the second reference addendum and a second reference dedendum having a second reference-dedendum thickness. The second reference addendum has a second reference-addendum thickness. The second addendum-portion thickness is less than the second reference-addendum thickness by about twice the second predetermined half pitch relief The second gear basic-cutter tooth-profile dedendum has a second dedendum portion having a second dedendum-portion shape and a second dedendum-portion thickness. The second dedendum portion extends from the second limit point to the second pitch line. The second dedendum-portion shape is at least substantially identical to a corresponding portion of the second reference dedendum. The second dedendum thickness is more than the second reference-dedendum thickness by about twice the second predetermined half pitch relief.

The present invention is alternatively directed to a method for producing a gear for mating with a mating gear. The gear has a plurality of gear teeth each having a gear tooth profile conjugate to a gear basic-cutter tooth profile of a gear basic-cutter tooth. The gear basic-cutter tooth profile includes a gear basic-cutter tooth-profile addendum, a gear basic-cutter tooth-profile dedendum, and a gear basic-cutter tooth-profile transition zone between the gear basic-cutter tooth-profile addendum and the gear basic-cutter tooth-profile dedendum. The mating gear has a plurality of mating-gear teeth each having a mating-gear tooth profile conjugate to a mating-gear basic-cutter tooth profile including a mating-gear basic-cutter tooth-profile addendum complementary with the gear basic-cutter tooth-profile dedendum, a mating-gear basic-cutter tooth-profile dedendum complementary with the gear basic-cutter tooth-profile addendum, and a mating-gear basic-cutter tooth-profile transition zone between the mating-gear basic-cutter tooth-profile addendum and the mating-gear basic-cutter tooth-profile dedendum. The mating-gear basic-cutter tooth-profile transition zone is non-complementary with the gear basic-cutter tooth-profile transition zone. The method comprises the steps of (a) determining the gear basic-cutter tooth profile and (b) making the gear with the plurality of gear teeth each having the gear tooth profile conjugate to the gear basic-cutter tooth profile determined in step (a). The determining step comprises: (1) defining an initial profile for the gear basic-cutter tooth profile wherein the gear basic-cutter tooth-profile addendum has a the gear basic-cutter tooth-profile convex portion and is complementary with the mating-gear basic-cutter tooth-profile dedendum, the gear basic-cutter tooth-profile dedendum has a gear basic-cutter tooth-profile concave portion and is complementary with the mating-gear basic-cutter tooth-profile addendum and the gear basic-cutter tooth-profile transition zone is linear and complementary with a linearized mating-gear basic-cutter tooth-profile transition zone; (2) modifying the gear basic-cutter tooth-profile from the gear basic-cutter pitch point to the gear basic-cutter limit point by increasing a dedendum thickness of the gear basic-cutter tooth by a predetermined pitch relief; (3) modifying the gear basic-cutter tooth-profile addendum by decreasing an addendum thickness of the gear basic-cutter tooth by the predetermined pitch relief; and (4) shaping a portion of the gear basic-cutter transition zone between a gear basic-cutter pitch line and a gear basic-cutter tooth-profile addendum point in the form of a smooth curve providing continuity of the gear basic-cutter tooth profile and continuity of the gear basic-cutter tooth-profile slope at the gear basic-cutter pitch line and the gear basic-cutter tooth-profile addendum point.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
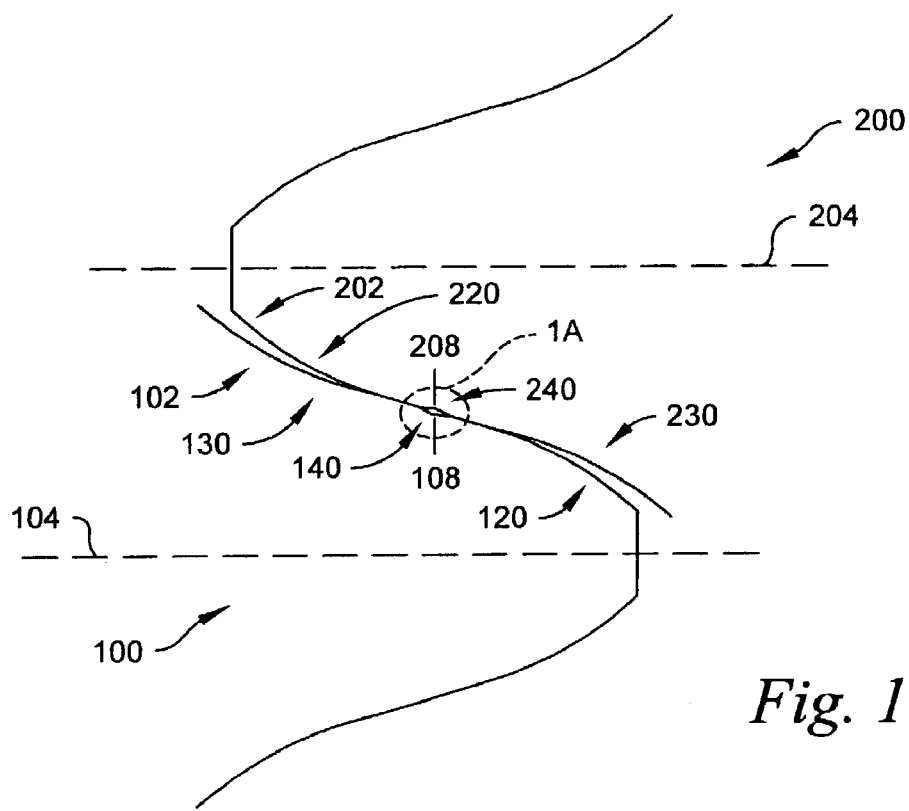
FIG. 1 is a view in a transverse plane of gear tooth profiles of a gear tooth mated with a mating gear tooth in accordance with a preferred embodiment of the present invention.

As used in the claims and the corresponding portions of the specification, the word "a" means "at least one." Further, unless otherwise defined the word "about" when used in conjunction with a numerical value means a range of values corresponding to the numerical value plus or minus ten percent of the numerical value.

As set forth in the '892 patent, incorporated by reference in its entirety herein, and well known by those skilled in the art, a family of gears can be defined by either a gear tooth profile, a pinion (or mating gear) tooth profile, the shape of the contact path between the gear tooth profile and the pinion tooth profile, a corresponding basic rack tooth profile or basic cutter tooth profile. As used herein, a family of gears comprises all gears that can be cut by the same basic cutter. The term "basic rack" refers to a gear with an infinite number of teeth spaced along a straight line and is the basic member of the family of gears. The basic rack is the complement of the basic cutter. In other words, the basic cutter and the basic rack can be fitted together face to face with completely coincident pitch and tooth surfaces. As the artisan understands that a gear tooth profile can be determined when any one of the above tooth profiles is known, for simplicity, in the claims and the corresponding disclosure below, the gear tooth profile of the present invention and the method for producing gears having the gear tooth profile will be described and claimed in terms of the corresponding basic cutter tooth profile.

When referring to elements of the invention in the disclosure below and in the drawings, like numerals indicate like elements throughout and primed numerals indicate elements of the basic-cutter. For example, the gear tooth-profile addendum is designated 120 and the gear basic-cutter tooth-profile addendum is designated 120'.

Figure 1A:
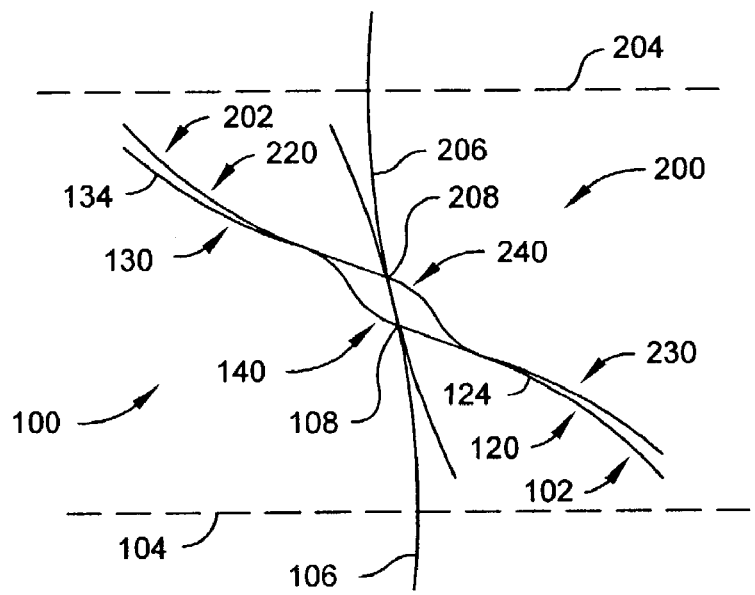
FIG. 1A is an enlarged view of the transition zones in FIG. 1.

Referring to FIGS. 1–1A, there is shown in a transverse plane a gear tooth profile 102 of a first preferred embodiment of a gear, generally designated 100, and hereinafter referred to as the gear 100 in accordance with the present invention.

The gear 100 has a gear pitch circle 106 and is for mating with a mating gear 200 having a mating-gear pitch circle 206. The mating gear 200 has a plurality of mating-gear teeth each having a mating-gear tooth profile 202 with a mating-gear tooth-profile centerline 204. The mating-gear tooth profile 202 intersects the mating-gear pitch circle 206 at a mating-gear pitch point 208.

The mating-gear tooth profile 202 comprising a mating-gear tooth-profile addendum 220 having a convex portion, a mating-gear tooth-profile dedendum 230 having a concave portion, and a gear tooth-profile transition zone 240 between the mating-gear tooth-profile addendum 220 and the mating-gear tooth-profile dedendum 230.

Figure 2:
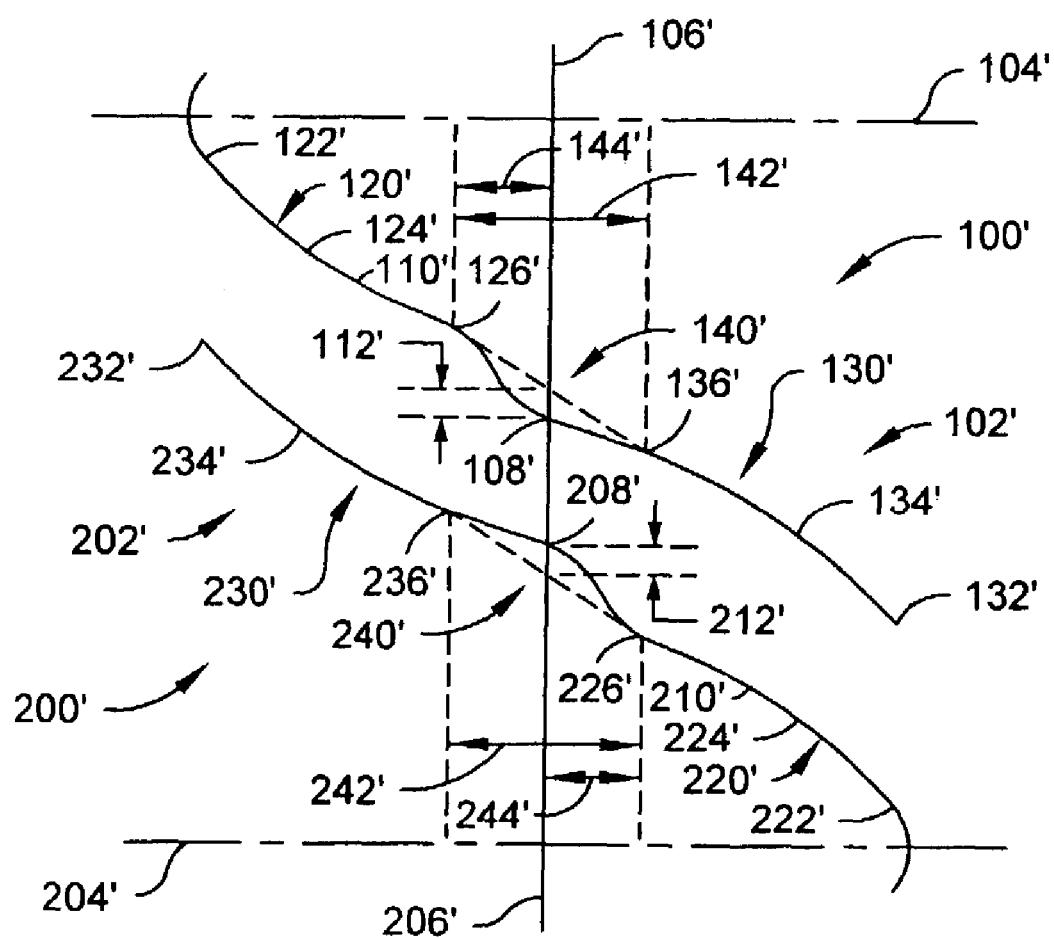
FIG. 2 is a view in a transverse plane of a portion of the tooth profile for a gear basic-cutter tooth conjugate to the gear tooth in FIG. 1 spaced from a portion of the tooth profile for a mating-gear basic-cutter tooth conjugate to the mating-gear tooth profile in FIG. 1.

Referring to FIG. 2, the mating-gear tooth profile 202 is conjugate to a mating-gear basic-cutter tooth profile 202' of a mating-gear basic cutter 200'. The mating-gear basic cutter tooth profile 202' has a mating-gear basic-cutter tooth profile centerline 204' and intersects the mating-gear basic-cutter pitch line 206' at a mating-gear basic-cutter tooth-profile pitch point 208'. The mating-gear basic-cutter tooth profile 202' includes a mating-gear basic-cutter tooth-profile addendum 220', a mating-gear basic-cutter tooth-profile dedendum 230', and a mating-gear basic-cutter tooth-profile transition zone 240' between the mating-gear basic-cutter tooth-profile addendum 220' and the mating-gear, basic-cutter tooth-profile dedendum 230'.

The gear 100 comprises a plurality of gear teeth each having the gear tooth profile 102. The gear tooth profile 102 has a gear tooth-profile centerline 104 and intersects the gear pitch circle 106 at the gear tooth-profile pitch point 108. The gear tooth profile 102 comprising a gear tooth-profile addendum 120 having a convex portion 124, a gear tooth-profile dedendum 130 having a concave portion 134, and a gear tooth-profile transition zone 140 between the gear tooth-profile addendum 120 and the gear tooth-profile dedendum 130.

The gear tooth profile 102 is conjugate to a gear basic-cutter tooth profile 102' of a gear basic cutter 100'. The gear basic-cutter tooth profile 102' has a gear basic-cutter tooth-profile centerline 104' and intersects the gear basic-cutter pitch line 106' at the gear basic-cutter tooth-profile pitch point 108'. The gear basic-cutter tooth profile 102' comprises a gear basic-cutter tooth-profile addendum 120', a gear basic-cutter tooth-profile dedendum 130', and a gear basic-cutter tooth-profile transition zone 140'.

The gear basic-cutter tooth-profile addendum 120' is conjugate to the gear tooth-profile dedendum 130 and has a gear basic-cutter tooth-profile tip point 122' distal to the gear basic-cutter pitch line 106'. A gear basic-cutter tooth-profile convex portion 124' is in the gear basic-cutter tooth-profile addendum 120' and is complementary with a corresponding portion of the mating-gear basic-cutter tooth-profile dedendum 230'. The gear basic-cutter tooth-profile convex portion 124' has a gear basic-cutter tooth-profile addendum point

126' proximal to the gear basic-cutter pitch line 106'. Preferably, but not necessarily, the gear basic-cutter tooth-profile addendum point 126' is spaced from the gear basic-cutter pitch line 106' a distance about half a predetermined gear basic-cutter tooth-profile transition-zone width 142' discussed below.

The gear basic-cutter tooth-profile dedendum 130' is conjugate to the gear tooth-profile addendum 120 and has a gear basic-cutter tooth-profile limit point 132' distal to the gear basic-cutter pitch line 106'. The gear basic-cutter tip point 122' lies the same distance from the gear basic-cutter pitch line 106' as the distance between the mating-gear basic cutter limit point 232' and the mating-gear basic-cutter pitch line 206'. A gear basic-cutter tooth-profile concave portion 134' is in the gear basic-cutter tooth-profile dedendum 130' and is complementary with a corresponding portion of the mating-gear basic-cutter tooth-profile addendum 220'. The gear basic-cutter tooth-profile concave portion 134' has a gear basic-cutter tooth-profile dedendum point 136' proximal to the gear basic-cutter pitch line 106'. Preferably, but not necessarily, the gear basic-cutter tooth-profile addendum point 126' and the gear basic-cutter tooth-profile dedendum point 136' are generally equidistant from the gear basic-cutter pitch line 106'.

The gear basic-cutter tooth-profile transition zone 140' is between the gear basic-cutter tooth-profile addendum point 126' and the gear basic-cutter tooth-profile dedendum point 136' and has a predetermined gear basic-cutter tooth-profile transition-zone width 142'. Preferably, but not necessarily, the predetermined gear basic-cutter tooth-profile transition-zone width 142' is more than about 0.05 transverse modules and less than about 0.15 transverse modules. Within this range, a predetermined gear basic-cutter tooth-profile transition-zone width 142' of about 0.1 transverse modules is preferable.

The gear basic-cutter tooth-profile 102' has a predetermined gear basic-cutter tooth-profile half pitch relief 112' at the gear basic-cutter pitch line 106'. Preferably, but not necessarily, the predetermined gear basic-cutter tooth-profile half pitch relief 112' is more than about 0.005 transverse modules and less than about 0.015 transverse modules. Within this range, a predetermined gear basic-cutter tooth-profile half pitch relief 112' of about 0.01 transverse modules is preferable.

The gear basic-cutter tooth-profile 102' has continuity of profile and continuity of slope at the gear basic-cutter tooth-profile addendum point 126'. Preferably, but not necessarily, the gear basic-cutter tooth-profile transition zone 140' has a gear basic-cutter tooth-profile transition zone portion 144' between the gear basic-cutter pitch point 108' and the gear basic-cutter tooth-profile addendum point 126' having a generally cubic curve-like profile. Further, the gear basic-cutter tooth profile 102' preferably has a constant radius of curvature between the gear basic-cutter tooth-profile addendum point 126' and a gear basic-cutter tooth-profile arc point 110' on the gear basic-cutter tooth profile 102'. Preferably, the gear basic-cutter tooth-profile arc point 110' is spaced from the gear basic-cutter pitch line 106' about the predetermined gear basic-cutter tooth-profile transition-zone width 142'. The constant radius of curvature over the aforementioned portion of the gear basic-cutter tooth profile 102' is chosen to provide continuity of profile, profile slope and profile curvature at the gear basic-cutter tooth-profile arc point 110'.

Referring to FIG. 2, the present invention is alternatively directed to a gear basic cutter 100'. The gear basic cutter 100' is for making a gear 100 mateable with a mating gear 200 shown in FIG. 1. The gear 100 has a plurality of gear teeth each having a gear tooth profile 102 including a gear tooth-profile addendum 120, a gear tooth-profile dedendum 130, and gear tooth-profile transition zone 140 between the gear tooth-profile addendum 120 and the gear tooth-profile dedendum 130. The mating gear 200 has a plurality of mating-gear teeth each having a mating-gear tooth profile 202 conjugate to a mating-gear basic-cutter tooth profile 202' including a mating-gear basic-cutter tooth-profile addendum 220', a mating-gear basic-cutter tooth-profile dedendum 230', and a mating-gear basic-cutter tooth-profile transition zone 240' between the mating-gear basic-cutter tooth-profile addendum 220' and the mating-gear basic-cutter tooth-profile dedendum 230'.

The gear basic cutter 100' comprises a plurality of gear basic-cutter teeth each having a gear basic-cutter tooth-profile 102' intersecting a gear basic-cutter pitch line 106' at a gear basic-cutter pitch point 108'. The gear basic-cutter tooth profile 102' comprises a gear basic-cutter tooth-profile addendum 120', a gear basic-cutter tooth-profile dedendum 130', and a gear basic-cutter tooth-profile transition zone 140'.

The gear basic-cutter tooth-profile addendum 120' has a gear basic-cutter tooth-profile tip point 122' distal to the gear basic-cutter pitch line 106'. The gear basic-cutter tooth-profile addendum 120' is conjugate to the gear tooth-profile dedendum 130. A gear basic-cutter tooth-profile convex portion 124' is in the gear basic-cutter tooth-profile addendum 120' and is complementary with a corresponding portion of the mating-gear basic-cutter tooth-profile dedendum 230'. The gear basic-cutter tooth-profile convex portion 124' has a gear basic-cutter tooth-profile addendum point 126' proximal to the gear basic-cutter pitch line 106'. Preferably, but not necessarily, the gear basic-cutter tooth-profile addendum point 126' is spaced from the gear basic-cutter pitch line 106' a distance about half the predetermined gear basic-cutter tooth-profile transition-zone width 142'.

The gear basic-cutter tooth-profile dedendum 130' has a gear basic-cutter tooth-profile limit point 132' distal to the gear basic-cutter pitch line 106'. The gear basic-cutter tip point 122' lies the same distance from the gear basic-cutter pitch line 106' as the distance between the mating-gear basic cutter limit point 232' and the mating-gear basic-cutter pitch line 206'. The gear basic-cutter tooth-profile dedendum 130' is conjugate to the gear tooth-profile addendum 120'. A gear basic-cutter tooth-profile concave portion 134' is in the gear basic-cutter tooth-profile dedendum 130' and is complementary with a corresponding portion of the mating-gear basic-cutter tooth-profile addendum 220'. The gear basic-cutter tooth-profile concave portion 134' has a gear basic-cutter tooth-profile dedendum point 136' proximal to the gear basic-cutter pitch line 106'. Preferably, but not necessarily, the gear basic-cutter tooth-profile addendum point 126' and the gear basic-cutter tooth-profile dedendum point 136' are generally equidistant from the gear basic-cutter pitch line 106'.

The gear basic-cutter tooth-profile transition zone 140' is between the gear basic-cutter tooth-profile addendum point 126' and the gear basic-cutter tooth-profile dedendum point 136' and has a predetermined gear basic-cutter tooth-profile transition-zone width 142'. Preferably, but not necessarily, the predetermined gear basic-cutter tooth-profile transition-zone width 142' is more than about 0.05 transverse modules and less than about 0.15 transverse modules. Within this range, a predetermined gear basic-cutter tooth-profile transition-zone width 142' of about 0.1 transverse modules is preferable.

The gear basic-cutter tooth-profile 102' has a predetermined gear basic-cutter tooth-profile half pitch relief 112' at the gear basic-cutter pitch line 106'. Preferably, but not necessarily, the predetermined gear basic-cutter tooth-profile half pitch relief 112' is more than about 0.005 transverse modules and less than about 0.015 transverse modules. Within this range, a predetermined gear basic-cutter tooth-profile half pitch relief 112' of about 0.01 transverse modules is preferable.

The gear basic-cutter tooth-profile 102' has continuity of profile and continuity of slope at the gear basic-cutter tooth-profile addendum point 126'. Preferably, but not necessarily, the gear basic-cutter tooth-profile transition zone 140' has a gear basic-cutter tooth-profile transition zone portion 144' between the gear basic-cutter pitch point 108' and the gear basic-cutter tooth-profile addendum point 126' having a generally cubic curve-like profile. Still further, the gear basic-cutter tooth profile 102' preferably has a constant radius of curvature between the gear basic-cutter tooth-profile addendum point 126' and a gear basic-cutter tooth-profile arc point 110' on the gear basic-cutter tooth profile 102'. Preferably, the gear basic-cutter tooth-profile arc point 110' is spaced from the gear basic-cutter pitch line 106' about the predetermined gear basic-cutter tooth-profile transition-zone width 142'. The constant radius of curvature over the aforementioned portion of the gear basic-cutter tooth profile 102' is chosen to provide continuity of profile, profile slope and profile curvature at the gear basic-cutter tooth-profile arc point 110'.

The present invention is alternatively directed to a gear pair comprising a first gear 100 and a second gear 200. The first gear 100 comprises a plurality of first gear teeth each having a first gear tooth profile 102. The first gear tooth profile 102 has a first gear tooth-profile centerline 104 and intersects the first gear pitch circle 106 at the first gear tooth-profile pitch point 108. The first gear tooth profile 102 comprising a first gear tooth-profile addendum 120 having a first gear tooth-profile addendum convex portion 124, a first gear tooth-profile dedendum 130 having a first gear tooth-profile dedendum concave portion 134, and a first gear tooth-profile transition zone 140 between the first gear tooth-profile addendum 120 and the first gear tooth-profile dedendum 130.

The first gear tooth profile 102 is conjugate to a first gear basic-cutter tooth-profile 102' of a first gear basic cutter 100'. The first gear basic-cutter tooth-profile 102' has a first gear basic-cutter tooth-profile centerline 104' and intersecting a first gear basic-cutter pitch line 106' at a first gear basic-cutter pitch point 108'. The first gear basic-cutter tooth profile 102' comprises a first gear basic-cutter tooth-profile addendum 120', a first gear basic-cutter tooth-profile dedendum 130', and a first gear basic-cutter tooth-profile transition zone 140'.

The first gear basic-cutter tooth-profile addendum 120' is conjugate to the first gear tooth-profile dedendum 130 and has a first tip point 122' distal to the first gear basic-cutter pitch line 106'. A first gear basic-cutter tooth-profile convex portion 124' is within the first gear basic-cutter tooth-profile addendum 120'. The first gear basic-cutter tooth-profile convex portion 124' has a first gear basic-cutter tooth-profile addendum point 126' proximal to the first gear basic-cutter pitch line 106'.

The first gear basic-cutter tooth-profile dedendum 130' is conjugate to the first gear tooth-profile addendum 120 and has a first limit point 132' distal to the first gear basic-cutter pitch line 106'. The first gear basic-cutter tip point 122' lies the same distance from the first gear basic-cutter pitch line 106' as the distance between the second-gear basic cutter limit point 232' and the second-gear basic-cutter pitch line 206'. A first gear basic-cutter tooth-profile concave portion 134' is within the first gear basic-cutter tooth-profile dedendum 130'. The first gear basic-cutter tooth-profile concave portion 134' has a first gear basic-cutter tooth-profile dedendum point 136' proximal to the first gear basic-cutter pitch line 106'.

The first gear basic-cutter tooth-profile transition zone 140' is between the first gear basic-cutter tooth-profile addendum point 126' and the first gear basic-cutter tooth-profile dedendum point 136'. The first gear basic-cutter tooth-profile transition zone 140' has a predetermined first gear basic-cutter tooth-profile transition-zone width 142'.

The first gear basic-cutter tooth-profile 102' has a predetermined first gear basic-cutter tooth-profile half pitch relief 112' at the first gear basic-cutter pitch line 106' and continuity of profile and continuity of slope at the first gear basic-cutter tooth-profile addendum point 126'.

Preferably, but not necessarily, the first gear basic-cutter tooth-profile transition zone 140' has a first gear basic-cutter tooth-profile transition zone portion 144' between the first gear basic-cutter pitch point 108' and the first gear basic-cutter tooth-profile addendum point 126' having a generally cubic curve-like profile. Further, the first gear basic-cutter tooth profile 102' preferably has a constant radius of curvature between the first gear basic-cutter tooth-profile addendum point 126' and a first gear basic-cutter tooth-profile arc point 110' on the first gear basic-cutter tooth profile 102'. Preferably, the first gear basic-cutter tooth-profile arc point 110' is spaced from the first gear basic-cutter pitch line 106' about the predetermined first gear basic-cutter tooth-profile transition-zone width 142'. The constant radius of curvature over the aforementioned portion of the first gear basic-cutter tooth profile 102' is chosen to provide continuity of profile, profile slope and profile curvature at the first gear basic-cutter tooth-profile arc point 110'.

The second gear 200 comprises a second plurality of second gear teeth each having a second gear tooth profile 202. The second gear tooth profile 202 has a second gear tooth-profile centerline 204 and intersects the second gear pitch circle 206 at the second gear tooth-profile pitch point 208. The second gear tooth profile 202 comprising a second gear tooth-profile addendum 220, a second gear tooth-profile dedendum 230, and a second gear tooth-profile transition zone 240 between the second gear tooth-profile addendum 220 and the second gear tooth-profile dedendum 230.

The second gear tooth profile 202 is conjugate to a second gear basic-cutter tooth-profile 202' of a second gear basic-cutter 200'. The second gear basic-cutter tooth-profile 202' has a second gear basic-cutter tooth-profile centerline 204' and intersects a second gear basic-cutter pitch line 206' at a second gear basic-cutter pitch point 208'. The second gear basic-cutter tooth profile 202' comprises a second gear basic-cutter tooth-profile addendum 220', a second gear basic-cutter tooth-profile dedendum 230', and a second gear basic-cutter tooth-profile transition zone 240'.

The second gear basic-cutter tooth-profile addendum 220' is conjugate to the second gear tooth-profile dedendum 230 and has a second tip point 222' distal to the second gear basic-cutter pitch line 206'. A second gear basic-cutter tooth-profile convex portion 224' is within the second gear basic-cutter tooth-profile addendum 220' and is complementary with a corresponding portion of the first gear basic-cutter tooth-profile dedendum 230'. The second gear basic-cutter tooth-profile convex portion 224' has a second gear basic-cutter tooth-profile addendum point 226' proximal to the second gear basic-cutter pitch line 206'.

The second gear basic-cutter tooth-profile dedendum 230' is conjugate to the second gear tooth-profile addendum 220 and has a second limit point 232' distal to the second gear basic-cutter pitch line 206'. The second gear basic-cutter tip point 222' lies the same distance from the second gear basic-cutter pitch line 206' as the distance between the first gear basic cutter limit point 132' and the first gear basic-cutter pitch line 106'. A second gear basic-cutter tooth-profile concave portion 234' is within the second gear basic-cutter tooth-profile dedendum 230' and is complementary with a corresponding portion of the first gear basic-cutter tooth-profile addendum 220'. The second gear basic-cutter tooth-profile concave portion 234' has a second gear basic-cutter tooth-profile dedendum point 236' proximal to the second gear basic-cutter pitch line 206'.

The second gear basic-cutter tooth-profile transition zone 240' is between the second gear basic-cutter tooth-profile addendum point 226' and the second gear basic-cutter tooth-profile dedendum point 236'. The second gear basic-cutter tooth-profile transition zone 240' has a predetermined second gear basic-cutter tooth-profile transition-zone width 242'.

The second gear basic-cutter tooth-profile 202' has a predetermined second gear basic-cutter tooth-profile half pitch relief 212' at the second gear basic-cutter pitch line 206' and continuity of profile and continuity of slope at the second gear basic-cutter tooth-profile addendum point 226'. Preferably, but not necessarily, the second gear basic-cutter tooth-profile transition zone 240' has a second gear basic-cutter tooth-profile transition zone portion 244' between the second gear basic-cutter pitch point 208' and the second gear basic-cutter tooth-profile addendum point 226' having a generally cubic curve-like profile. Further, the second gear basic-cutter tooth profile 202' preferably has a constant radius of curvature between the second gear basic-cutter tooth-profile addendum point 226' and a second gear basic-cutter tooth-profile arc point 210' on the second gear basic-cutter tooth profile 202'. Preferably, the second gear basic-cutter tooth-profile arc point 210' is spaced from the second gear basic-cutter pitch line 206' about the predetermined second gear basic-cutter tooth-profile transition-zone width 242'. The constant radius of curvature over the aforementioned portion of the second gear basic-cutter tooth profile 202' is chosen to provide continuity of profile, profile slope and profile curvature at the first gear basic-cutter tooth-profile arc point 210'.

Figure 3:
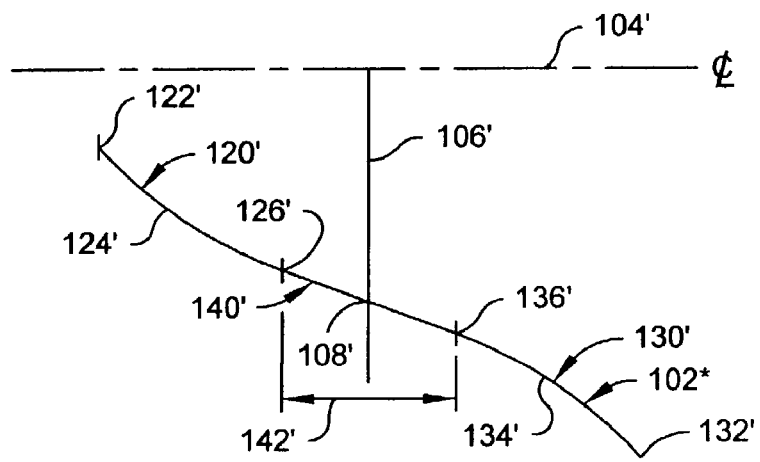
FIG. 3 is a view in a transverse plane of a portion of an initial gear basic-cutter tooth profile with a linear transition zone in accordance with a step in a preferred method of the present invention.
Figure 4:
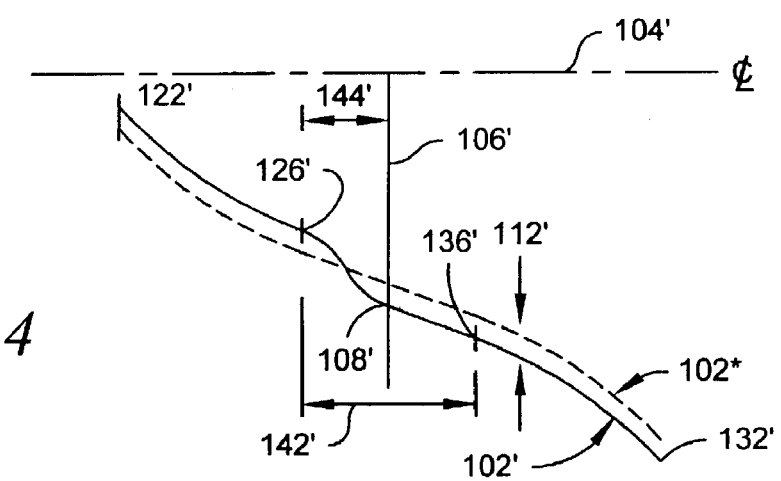
FIG. 4 is a view in a transverse plane of a portion of a gear basic-cutter tooth profile with a predetermined half pitch relief in accordance with a step in a preferred method of the present invention.
Figure 5:
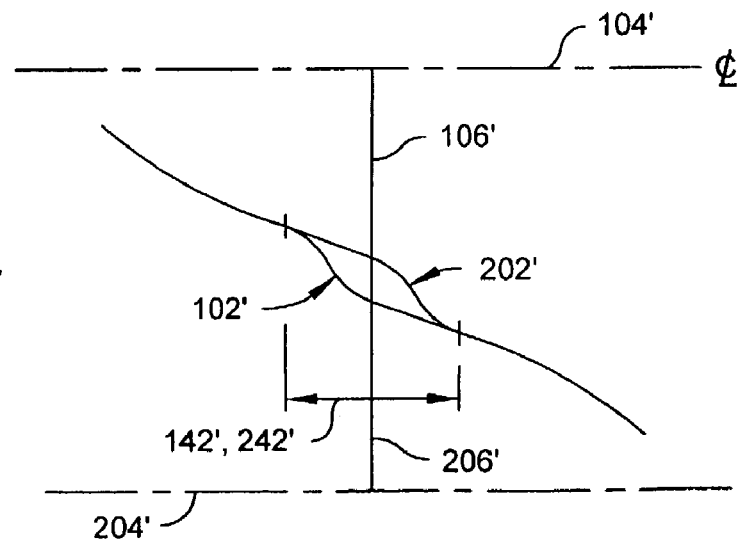
FIG. 5 is a view in a transverse plane of a portion of a gear basic-cutter tooth profile and a mating-gear basic-cutter tooth profile with complementary addenda and dedenda and a predetermined pitch relief in the transition zone in accordance with a preferred method of the present invention.

Referring to FIGS. 3–5, there is shown a preferred method for producing a gear 100 for mating with a mating gear 200 in accordance with the present invention. The method for producing gear 100 comprises two basic steps: (a) determining the gear basic cutter tooth profile 102' and (b) making the gear 100 with the plurality of gear teeth each having the gear tooth profile 102 conjugate to the gear basic-cutter tooth profile 102' of the determining step.

As disclosed above, the gear 100 produced by the preferred method has a plurality of gear teeth each having a gear tooth profile 102 conjugate to a gear basic-cutter tooth profile 102' of a gear basic-cutter tooth. The gear basic-cutter tooth profile 102' has a gear basic-cutter tooth-profile centerline 104' and intersects the gear basic-cutter pitch line 106' at the gear basic-cutter tooth-profile pitch point 108'. The gear basic-cutter tooth profile 102' includes a gear basic-cutter tooth-profile addendum 120', a gear basic-cutter tooth-profile dedendum 130', and a gear basic-cutter tooth-profile transition zone 140' between the gear basic-cutter tooth-profile addendum 120' and the gear basic-cutter tooth-profile dedendum 130'.

The mating gear 200 has a plurality of mating-gear teeth each having a mating-gear tooth profile 202 conjugate to a mating-gear basic-cutter tooth profile 202' of a mating-gear basic-cutter. The mating-gear basic-cutter tooth profile includes a mating-gear basic-cutter tooth-profile addendum 220' complementary with the gear basic-cutter tooth-profile dedendum 130', a mating-gear basic-cutter tooth-profile dedendum 230' complementary with the gear basic-cutter tooth-profile addendum 120', and a mating-gear basic-cutter tooth-profile transition zone 240' between the mating-gear basic-cutter tooth-profile addendum 220' and the mating-gear basic-cutter tooth-profile dedendum 230'. The mating-gear basic-cutter tooth-profile transition zone 240' is non-complementary with the gear basic-cutter tooth-profile transition zone 140'.

The determining step comprises the following four steps: (1) defining an initial profile for the gear basic-cutter tooth profile, (2) modify the gear basic-cutter tooth-profile dedendum, (3) modify the gear basic-cutter tooth-profile addendum, and (4) shaping a portion of the gear basic-cutter transition zone, each of which is further described below.

Referring to FIG. 3, in the defining an initial profile step, the initial profile 102* for the gear basic-cutter tooth profile 102' is defined such that the gear basic-cutter tooth-profile addendum 120' has a gear basic-cutter tooth-profile convex portion 124' and is complementary with the mating-gear basic-cutter tooth-profile dedendum 230', the gear basic-cutter tooth-profile dedendum 130' has a gear basic-cutter tooth-profile concave 134' and is complementary with the mating-gear basic-cutter tooth-profile addendum 220', and the gear basic-cutter tooth-profile transition zone 140' is linear and complementary with a linearized mating-gear basic-cutter tooth-profile transition zone (not shown). The '892 patent describes how the addendum profiles and dedendum profiles are determined and for brevity are not repeated here.

To obtain a gear tooth profile and a mating-gear tooth profile that are not conjugate in the transition zone, the gear basic-cutter tooth profile and the mating-gear basic-cutter tooth profile are modified so that they do not contact in the transition zone, but do contact each other in the addendum and dedendum portions of the profile. This feature is achieved by the modifying and shaping steps of the method of the present invention and can best be understood by referring to FIGS. 3–4 which illustrate a preferred implementation of the method of the present invention. The initial gear basic-cutter tooth profile 102* determined in the step defining an initial profile discussed above is shown in FIG. 3 by a solid line and appears in FIG. 4 as a dotted line. After implementation of the method of the present invention, the gear basic-cutter tooth profile 102' has addendum and dedendum complementary with the mating-gear basic-cutter tooth profile and a non-complementary transition zone 140' and is shown in FIG. 4 as a solid line.

In the step modifying the gear basic-cutter tooth-profile dedendum, the gear basic-cutter tooth-profile dedendum 130' is modified by increasing the dedendum thickness of the gear basic-cutter tooth by the predetermined pitch relief 112' discussed above. Preferably, but not necessarily, the dedendum thickness is increased by moving without change of shape a portion of the gear basic-cutter tooth-profile extending from the gear basic-cutter pitch line 106' to a limit point 132' distal to the gear basic-cutter pitch line 106' a distance equivalent to the predetermined half pitch relief away from the tooth center-line 104' in the direction parallel to the pitch line 106'.

In the modifying the gear basic-cutter tooth-profile addendum step, the gear basic-cutter tooth-profile addendum 120' is modified by decreasing the addendum thickness of the gear basic-cutter tooth by the predetermined pitch relief. Preferably, but not necessarily, the addendum thickness is decreased by moving without change of shape a portion of the gear basic-cutter tooth-profile extending from the gear basic-cutter tooth-profile addendum point 126' to a tip point 122' distal to the gear basic-cutter pitch line 106' a distance equivalent to the predetermined half pitch relief toward the tooth center-line 104' in the direction parallel to the pitch line 106'.

In the shaping step, a portion 144' of the gear basic-cutter transition zone 140' between the gear basic-cutter pitch line 106' and the gear basic-cutter tooth-profile addendum point 126' is shaped in the form of a smooth curve providing continuity of the gear basic-cutter tooth profile 102' and continuity of the gear basic-cutter tooth profile slope at the gear basic-cutter pitch line 106' and the gear basic-cutter tooth-profile addendum point 126'. Preferably, but not necessarily, the portion 144' of the gear basic-cutter transition zone 140' between a gear basic-cutter pitch line 106' and a gear basic-cutter tooth-profile addendum point 126' is in the form of a cubic curve.

Those skilled in the art will understand that if the basic-cutter tooth profile shown in FIG. 3 is that of a gear, then the basic-cutter tooth profile of a mating gear before modification is its complement. In other words, the profile looks the same, but the limit point of the gear basic-cutter tooth-profile is now the tip point of the mating-gear basic-cutter tooth profile. Further, the artisan will understand that the mating-gear basic-cutter tooth profile may be modified by the procedure described above, increasing its dedendum tooth thickness and decreasing its addendum tooth thickness. When the gear basic-cutter tooth-profile and the mating-gear basic-cutter tooth profile are placed together, as shown in FIG. 5, there is now an overlap between the two profiles at the pitch line, equal to the predetermined pitch relief. The gears which are conjugate to these basic cutters will be cut without undercutting, and will have no contact in the transition zone.

Those skilled in the art will appreciate that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A gear for mating with a mating gear having a plurality of mating-gear teeth each having a mating-gear tooth profile conjugate to a mating-gear basic-cutter tooth profile including a mating-gear basic-cutter tooth-profile addendum, a mating-gear basic-cutter tooth-profile dedendum, and a mating-gear basic-cutter tooth-profile transition zone between the mating-gear basic-cutter tooth-profile addendum and the mating-gear basic-cutter tooth-profile dedendum, the gear comprising a plurality of gear teeth each having a gear tooth profile comprising:
   a gear tooth-profile addendum;
   a gear tooth-profile dedendum; and
   a gear tooth-profile transition zone between the gear tooth-profile addendum and the gear tooth-profile dedendum,
   wherein the gear tooth profile is conjugate to a gear basic-cutter tooth-profile intersecting a gear basic-cutter pitch line at a gear basic-cutter pitch point, the gear basic-cutter tooth profile comprising:
     a gear basic-cutter tooth-profile addendum having a tip point distal to the gear basic-cutter pitch line, the gear basic-cutter tooth-profile addendum conjugate to the gear tooth-profile dedendum;
     a gear basic-cutter tooth-profile convex portion in the gear basic-cutter tooth-profile addendum and complementary with a corresponding portion of the mating-gear basic-cutter tooth-profile dedendum, the gear basic-cutter tooth-profile convex portion having a gear basic-cutter tooth-profile addendum point proximal to the gear basic-cutter pitch line;
     a gear basic-cutter tooth-profile dedendum having a limit point distal to the gear basic-cutter pitch line, the gear basic-cutter tooth-profile dedendum conjugate to the gear tooth-profile addendum;
     a gear basic-cutter tooth-profile concave portion in the gear basic-cutter tooth-profile dedendum and complementary with a corresponding portion of the mating-gear basic-cutter tooth-profile addendum, the gear basic-cutter tooth-profile concave portion having a gear basic-cutter tooth-profile dedendum point proximal to the gear basic-cutter pitch line; and
     a gear basic-cutter tooth-profile transition zone between the gear basic-cutter tooth-profile addendum point and the gear basic-cutter tooth-profile dedendum point, the gear basic-cutter tooth-profile transition zone having a predetermined gear basic-cutter tooth-profile transition-zone width,
   wherein the gear basic-cutter tooth-profile has a predetermined gear basic-cutter tooth-profile half pitch relief at the gear basic-cutter pitch line and continuity of profile and continuity of slope at the gear basic-cutter tooth-profile addendum point,
   wherein the gear basic-cutter tooth-profile addendum has an addendum portion having an addendum-portion shape and an addendum-portion thickness, the addendum portion extending from the tip point to the addendum point, the addendum-portion shape at least substantially identical to a corresponding portion of a reference addendum of a reference gear basic-cutter tooth profile further comprising a linear reference transition zone between the reference addendum and a reference dedendum having a reference-dedendum thickness, the reference addendum having a reference-addendum thickness, the addendum-portion thickness less than the reference-addendum thickness by about twice the predetermined half pitch relief, and
   wherein the gear basic-cutter tooth-profile dedendum has a dedendum portion having a dedendum-portion shape and a dedendum-portion thickness, the dedendum portion extending from the limit point to the pitch line, the dedendum-portion shape at least substantially identical to a corresponding portion of the reference dedendum, the dedendum thickness more than the reference-dedendum thickness by about twice the predetermined half pitch relief.

2. The gear according to claim 1, wherein the gear basic-cutter tooth-profile addendum point and the gear basic-cutter tooth-profile dedendum point are generally equidistant from the gear basic-cutter pitch line.

3. The gear according to claim 1, wherein the predetermined gear basic-cutter tooth-profile transition-zone width is more than about 0.05 transverse modules and less than about 0.15 transverse modules and the predetermined gear basic-cutter tooth-profile half pitch relief is more than about 0.005 transverse modules and less than about 0.015 transverse modules.

4. The gear according to claim 3, wherein the predetermined gear basic-cutter tooth-profile transition-zone width is about 0.1 transverse modules and the predetermined gear basic-cutter tooth-profile half pitch relief is about 0.01 transverse modules.

5. The gear according to claim 1, wherein the gear basic-cutter tooth-profile transition zone has a gear basic-cutter tooth-profile transition zone portion between the gear basic-cutter pitch point and the gear basic-cutter tooth-profile addendum point having a generally cubic curve-like profile.

6. The gear according to claim 1, wherein the gear basic-cutter tooth-profile addendum point and the gear basic-cutter tooth-profile dedendum point are generally equidistant from the gear basic-cutter pitch line, and the gear basic-cutter tooth-profile transition zone has a gear basic-cutter tooth-profile transition zone portion between the gear basic-cutter pitch point and the gear basic-cutter tooth-profile addendum point having a generally cubic curve-like profile.

7. The gear according to claim 1, wherein the gear basic-cutter tooth-profile addendum point is spaced from the gear basic-cutter pitch line a distance about half the predetermined gear basic-cutter tooth-profile transition-zone width and the gear basic-cutter tooth profile has a constant radius of curvature between the gear basic-cutter tooth-profile addendum point and a gear basic-cutter tooth-profile arc point on the gear basic-cutter tooth profile spaced from the gear basic-cutter pitch line about the predetermined gear basic-cutter tooth-profile transition-zone width, the gear basic-cutter tooth profile having continuity of profile, profile slope and profile curvature at the gear basic-cutter tooth-profile arc point.

8. A gear pair comprising a first gear and a second gear, the first gear comprising a plurality of first gear teeth each having a first gear tooth profile comprising:
 a first gear tooth-profile addendum;
 a first gear tooth-profile dedendum; and
 a first gear tooth-profile transition zone between the first gear tooth-profile addendum and the first gear tooth-profile dedendum,
 wherein the first gear tooth profile is conjugate to a first gear basic-cutter tooth-profile intersecting a first gear basic-cutter pitch line at a first gear basic-cutter pitch point, the first gear basic-cutter tooth profile comprising:
  a first gear basic-cutter tooth-profile addendum having a first tip point distal to the gear basic-cutter pitch line, the first gear basic-cutter tooth-profile addendum conjugate to the first gear tooth-profile dedendum;
  a first gear basic-cutter tooth-profile convex portion in the first gear basic-cutter tooth-profile addendum, the first gear basic-cutter tooth-profile convex portion having a first gear basic-cutter tooth-profile addendum point proximal to the first gear basic-cutter pitch line;
  a first gear basic-cutter tooth-profile dedendum having a first limit point distal to the first gear basic-cutter pitch line, the first gear basic-cutter tooth-profile dedendum conjugate to the first gear tooth-profile addendum;
  a first gear basic-cutter tooth-profile concave portion in the first gear basic-cutter tooth-profile dedendum, the first gear basic-cutter tooth-profile concave portion having a first gear basic-cutter tooth-profile dedendum point proximal to the first gear basic-cutter pitch line; and
  a first gear basic-cutter tooth-profile transition zone between the first gear basic-cutter tooth-profile addendum point and the first gear basic-cutter tooth-profile dedendum point, the first gear basic-cutter tooth-profile transition zone having a predetermined first gear basic-cutter tooth-profile transition-zone width,
 wherein the first gear basic-cutter tooth-profile has a predetermined first gear basic-cutter tooth-profile half pitch relief at the first gear basic-cutter pitch line and continuity of profile and continuity of slope at the first gear basic-cutter tooth-profile addendum point,
 wherein the first gear basic-cutter tooth-profile addendum has a first addendum portion having a first addendum-portion shape and a first addendum-portion thickness, the first addendum portion extending from the first tip point to the first gear basic-cutter tooth-profile addendum point, the first addendum-portion shape at least substantially identical to a corresponding portion of a first reference addendum of a first reference gear basic-cutter tooth profile further comprising a first linear reference transition zone between the first reference addendum and a first reference dedendum having a first reference-dedendum thickness, the first reference addendum having a first reference-addendum thickness, the first addendum-portion thickness less than the first reference-addendum thickness by about twice the predetermined half pitch relief, and
 wherein the first gear basic-cutter tooth-profile dedendum has a first dedendum portion having a first dedendum-portion shape and a first dedendum-portion thickness, the first dedendum portion extending from the first limit point to the first pitch line, the first dedendum-portion shape at least substantially identical to a corresponding portion of the first reference dedendum, the first dedendum thickness more than the first reference-dedendum thickness by about twice the predetermined half pitch relief,
the second gear comprising a second plurality of second gear teeth each having a second gear tooth profile comprising:
 a second gear tooth-profile addendum;
 a second gear tooth-profile dedendum; and
 second gear tooth-profile transition zone between the second gear tooth-profile addendum and the second gear tooth-profile dedendum,
 wherein the second gear tooth profile is conjugate to a second gear basic-cutter tooth-profile intersecting a second gear basic-cutter pitch line at a second gear basic-cutter pitch point, the second gear basic-cutter tooth profile comprising:
  a second gear basic-cutter tooth-profile addendum having a second tip point distal to the second gear basic-cutter pitch line, the second gear basic-cutter tooth-profile addendum conjugate to the second gear tooth-profile dedendum;

a second gear basic-cutter tooth-profile convex portion in the second gear basic-cutter tooth-profile addendum and complementary with a corresponding portion of the first gear basic-cutter tooth-profile dedendum, the second gear basic-cutter tooth-profile convex portion having a second gear basic-cutter tooth-profile addendum point proximal to the second gear basic-cutter pitch line;

a second gear basic-cutter tooth-profile dedendum having a second limit point distal to the second gear basic-cutter pitch line, the second gear basic-cutter tooth-profile dedendum conjugate to the second gear tooth-profile addendum;

a second gear basic-cutter tooth-profile concave portion in the second gear basic-cutter tooth-profile dedendum and complementary with a corresponding portion of the first gear basic-cutter tooth-profile addendum, the second gear basic-cutter tooth-profile concave portion having a second gear basic-cutter tooth-profile dedendum point proximal to the second gear basic-cutter pitch line; and a second gear basic-cutter tooth-profile transition zone between the second gear basic-cutter tooth-profile addendum point and the second gear basic-cutter tooth-profile dedendum point, the second gear basic-cutter tooth-profile transition zone having a predetermined second gear basic-cutter tooth-profile transition-zone width, wherein the second gear basic-cutter tooth-profile has a predetermined second gear basic-cutter tooth-profile half pitch relief at the second gear basic-cutter pitch line and continuity of profile and continuity of slope at the second gear basic-cutter tooth-profile addendum point, wherein the second gear basic-cutter tooth-profile addendum has a second addendum portion having a second addendum-portion shape and a second addendum-portion thickness, the second addendum portion extending from the second tip point to the second addendum point, the second addendum-portion shape at least substantially identical to a corresponding portion of a second reference addendum of a second reference gear basic-cutter tooth profile further comprising a second linear reference transition zone between the second reference addendum and a second reference dedendum having a second reference-dedendum thickness, the second reference addendum having a second reference-addendum thickness, the second addendum-portion thickness less than the second reference-addendum thickness by about twice the predetermined second half pitch relief, and wherein the second gear basic-cutter tooth-profile dedendum has a second dedendum portion having a second dedendum-portion shape and a second dedendum-portion thickness, the second dedendum portion extending from the second limit point to the second pitch line, the second dedendum-portion shape at least substantially identical to a corresponding portion of the second reference dedendum, the second dedendum thickness more than the second reference-dedendum thickness by about twice the predetermined second half pitch relief.

\* \* \* \* \*